United States Patent Office 2,727,862
Patented Dec. 20, 1955

2,727,862

MINERAL OIL COMPOSITIONS CONTAINING POLYMERS OF ALKYL N-SUBSTITUTED MALEIMIDES

John J. Giammaria, Woodbury, N. J., assignor to Socony Mobil Oil Company, Inc., a corporation of New York No Drawing. Original application September 29, 1949, Serial No. 118,704, now Patent No. 2,669,555, dated February 16, 1954. Divided and this application May 2, 1952, Serial No. 285,800

5 Claims. (Cl. 252—51.5)

This invention relates to improved lubricating oil compositions. More particularly, the invention is concerned with mineral lubricating oil compositions containing polymers of N-alkyl maleimides, in which the alkyl substituent is a normal, saturated, aliphatic radical having from about 12 to about 18 carbon atoms, or a mixture of radicals, having from 8 to 18 carbon atoms, as pour depressants and viscosity index improvers.

It has been shown in United States Patent No. 2,301,356 that imides of olefinic dicarboxylic acids and certain N-substituted derivatives of these imides may be copolymerized with 1-olefins, the polymer products having certain applications in the field of plastics. It is also known, as disclosed in United States Patent No. 2,370,943, that N-octadecyl maleimide can be copolymerized with styrene, the product being useful as a mineral oil pour depressant.

Again, United States Patent No. 2,412,557 describes polymeric compounds derived by reaction of an alpha, beta ethylenic acid, or anhydride, and an unsaturated primary or secondary amine, in which the unsaturation is ethylenic and the ethylenic carbon atom nearest to the amino N atom is separated from said N atom by at least four singly-bonded carbon atoms. These polymers are claimed as viscosity index improvers. Also, United States Patent No. 2,412,708 describes similar polymeric products, except that the alpha, beta, unsaturated dicarboxylic acid, or anhydride, is reacted with both an unsaturated amine and a saturated, non-aromatic amine. Such polymers are claimed as pour point depressants as well as viscosity index improvers. In the latter two instances, polymerization occurs through both the maleic double bond and the side chain double bond.

As distinguished from the aforesaid prior art disclosures, the present invention is directed to the preparation of N-alkyl maleimides obtained by reacting substantially equimolar quantities of maleic anhydride and a primary, normal, saturated, aliphatic amine, followed by polymerization of the maleimide so produced to form products useful as pour depressants and viscosity index improvers in mineral oils. It will be seen that polymerization of the N-alkyl maleimides contemplated herein, which correspond to the general formula

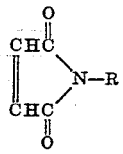

wherein R is a primary, normal, saturated, aliphatic group, can take place only through the maleic double bond and that the polymer products obtained will, therefore, differ from the products disclosed in Patents 2,412,557 and 2,412,708 discussed hereinabove.

It is the primary object of this invention to provide improved mineral lubricating oil compositions containing polymers of N-alkyl maleimides derived from primary, normal, saturated amines of from 12 to 18 carbon atoms, or mixtures of such amines containing from 8 to 18 carbon atoms. Other objects will become apparent from what follows.

Since, as far as is known, the maleimide polymers contemplated herein have not been known heretofore, they are claimed herein as new compositions of matter.

In accordance with this invention, the N-alkyl maleimides are prepared by mixing equimolar quantities of maleic anhydride and a primary, normal, saturated, aliphatic amine and heating the reaction mixture at a temperature of from about 150° C. to about 200° C. until the theoretical quantity of water is split out. The N-alkyl maleimide thus formed is then polymerized by heating at moderate temperatures, i. e. from about 75° C. to about 125° C. in the presence of a small amount, i. e. from about 1 per cent to about 5 per cent of an organic peroxide, such as benzoyl peroxide, for a period of time ranging from about 1 hour up to about 100 hours.

As aforesaid, the primary, normal, saturated, aliphatic amines suitable for use in the invention are those having from 8 to 18 carbon atoms. Specifically, octyl amine, nonyl amine, decyl amine, undecyl amine, dodecyl amine, tridecyl amine, tetradecyl amine, pentadecyl amine, hexadecyl amine, heptadecyl amine and octadecyl amine may be used. Mixtures of these amines may also be used. Amines of the character useful in the invention are marketed by Armour and Co. under the "Armeen" trade name. These include:

Armeen CD (mixed $C_8$ to $C_{18}$ primary amines)
Armeen 12D (n-dodecylamine)
Armeen 14D (n-tetradecylamine)
Armeen 16D (n-hexadecylamine) and
Armeen 18D (n-octadecylamine)

We have found that for preparing a viscosity index improver, the N-alkyl-substituted maleimide to be polymerized may be prepared from any of the above-mentioned primary, normal, saturated, aliphatic amines. However, in order to obtain a pour depressant, it has been found that the chain length of the amine used to prepare the alkyl N-substituted maleimide is very critical, in that only the maleimide prepared from tetradecyl and hexadecyl amines yield pour depressants on polymerization.

A full understanding of the invention may be had from the following illustrative examples and results of tests.

EXAMPLE I

Ninety-eight grams of maleic anhydride and 220 grams of Armeen CD, a mixture of primary, aliphatic amines containing 8 to 18 carbon atoms, were dissolved in 200 cc. of Sovasol 74, a high-boiling petroleum solvent. The solution was heated at 175° C., the water of reaction being azeotropically distilled into a suitable side-arm trap. After 17 cc. of water were collected, a major portion of the solvent was distilled from the reaction mixture and the temperature raised to 180° C. The mixture was then cooled and poured into acetone. Precipitated material, presumably the diamide or unconverted monoamide, was removed by filtering. The acetone was evaporated from the filtrate and any remaining Sovasol 74 was distilled by heating to 210° C. under 150 mm. vacuum. The residue, representing the Armeen CD maleimide, was a brown, viscous oil.

Thirty grams of the above were mixed with 0.9 grams of benzoyl peroxide and heated slowly to 100° C. The source of heat was removed at this point but the temperature continued to rise to 121° C. As the temperature subsided, heat was again applied to 100° C. and maintained for 48 hours. The viscous product was cooled, dissolved in benzene and washed with hot water. The solution was then filtered and the solvent distilled to obtain the finished polymerized maleimide as a dark viscous oil.

EXAMPLE II

Forty-nine grams of maleic anhydride and 92.5 grams of Armeen 12D, a relatively pure n-dodecylamine, were reacted as in Example I.

Twenty-six and one-half grams of the N-dodecyl maleimide from above and 0.79 gram of benzoyl peroxide were heated at 130° C. for 24 hours. The polymer, a dark brown, viscous oil, was purified as previously described.

EXAMPLE III

Fifteen and two-tenths grams of maleic anhydride and 33.0 grams of Armeen 14D, a relatively pure n-tetradecylamine, were reacted as in Example I.

Ten grams of N-tetradecyl maleimide from above and 0.3 gram of benzoyl peroxide were heated at 100° C. for 16 hours. The polymer, a dark brown, viscous oil, was purified as described in Example I.

EXAMPLE IV

Forty-nine grams of maleic anhydride and 120.5 grams of Armeen 16D, a relatively pure n-hexadecyl amine, were reacted as in Example I, except that the product was not poured into acetone.

Twenty grams of the N-hexadecyl maleimide from above and 0.6 gram of benzoyl peroxide were heated at 100° C. for 24 hours. The polymer, a dark brown, waxy solid, was purified as before.

EXAMPLE V

Sixty-nine grams of maleic anhydride and 188 grams of Armeen 18D, a relatively pure n-octadecylamine, were reacted as in Example I.

Twenty-five grams of N-octadecyl maleimide from above and 0.75 gram of benzoyl peroxide were heated at 100° C. for 92 hours. The polymer, a dark brown, waxy solid, was purified as previously described.

Pour point depression

The effectiveness of the various polymers as pour depressants in mineral lubricating oils is illustrated in Table I. The results were obtained using a Mid-Continent type base oil having a kinematic viscosity of 12.2 centistokes at 210° F. and an ASTM pour point of +20° F.

TABLE I

| Polymer Blended in Oil | Conc., Wt. Percent | A. S. T. M. Pour Point, °F. |
|---|---|---|
| Example I | 0.25 | +20 |
| Example II | 0.25 | +20 |
| Example III | 0.25 | −10 |
| Example IV | 0.25 | +5 |
| Example V | 0.25 | +20 |

These data illustrate the critical nature of the alkyl group in the substituted maleimide since only polymerized N-tetradecyl maleimide (Example III) and N-hexadecyl maleimide (Example IV) showed activity as pour depressants.

Viscosity index improvement

The effectiveness of the polymers as improvers of the viscosity index of mineral lubricating oil is illustrated in Table II. These results were obtained in an acid-refined Mid-Continent type oil stock having an initial viscosity index of 78.0.

TABLE II

| Polymer Blended in Oil | Conc., Wt. Percent | Kin. Vis. At 100° F. | Kin. Vis. At 210° F. | Viscosity Index |
|---|---|---|---|---|
| None | 0 | 30.02 | 4.77 | 78.0 |
| Example II | 2 | 31.82 | 5.01 | 86.8 |
| Example V | 2 | 31.76 | 5.02 | 88.0 |

The polymeric materials of this invention may be incorporated in lubricating oils in concentrations ranging from 0.01% to 20%. Normally, a higher concentration will be required to effect a satisfactory improvement in viscosity index than will be required to effect a satisfactory lowering of the pour point of the oil. For the latter purpose, a concentration of 0.01% to 2% is preferred.

It is within the concept of this invention to incorporate the new polymeric materials in oils containing other improving agents such as antioxidants, detergents, extreme pressure lubrication improvers, stabilizing agents, rust inhibitors and the like.

It is further contemplated that the products of this invention may be prepared and marketed in their pure form, that is, without admixture with lubricating oils, or may be prepared and marketed in concentrated solutions in oil, which concentrated solutions are adapted to be added to further quantities of oil to improve its characteristics.

Although the principles of the invention have been illustrated herein by means of certain examples and tests, it is not intended that the invention be in any way limited thereby, but only as indicated in the following claims.

This application is a division of application Serial No. 118,704 filed September 29, 1949, now issued as Patent No. 2,669,555, dated February 16, 1954.

I claim:

1. A mineral lubricating oil containing a small amount, sufficient to improve the viscosity index thereof, of a polymerized N-alkyl maleimide, the alkyl substituent of said maleimide having from about 8 to about 18 carbon atoms.

2. A mineral lubricating oil containing a small amount, from 0.1% to 20%, of a polymerized N-alkyl maleimide, the alkyl substituent of said maleimide having from about 8 to about 18 carbon atoms.

3. A mineral lubricating oil containing a small amount, sufficient to depress the pour point thereof, of a poly-N-tetradecyl maleimide.

4. A mineral lubricating oil containing a small amount, sufficient to depress the pour point thereof, of a poly-N-hexadecyl maleimide.

5. A mineral lubricating oil containing a small amount, sufficient to improve the viscosity index thereof, of a poly-N-octadecyl maleimide.

References Cited in the file of this patent

UNITED STATES PATENTS

| 2,306,918 | Weiss et al. | Dec. 29, 1942 |
| 2,370,943 | Dietrich | Mar. 6, 1945 |
| 2,412,557 | Blair | Dec. 17, 1946 |
| 2,412,708 | Blair | Dec. 17, 1946 |